(12) United States Patent
Miller et al.

(10) Patent No.: US 11,995,686 B2
(45) Date of Patent: *May 28, 2024

(54) SYSTEM AND METHOD FOR CONTROLLING AN ELECTRONIC DEVICE EMBEDDED IN A PACKAGE OF A CONSUMER PRODUCT

(71) Applicants: David Philip Miller, Zurich (CH); Michal Schwartz, Naharia (IL)

(72) Inventors: David Philip Miller, Zurich (CH); Michal Schwartz, Naharia (IL)

(73) Assignee: David Miller, Zurich (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/323,312

(22) Filed: May 24, 2023

(65) Prior Publication Data

US 2023/0385877 A1  Nov. 30, 2023

Related U.S. Application Data

(60) Division of application No. 17/644,034, filed on Dec. 13, 2021, now abandoned, which is a continuation of
(Continued)

(30) Foreign Application Priority Data

Sep. 6, 2011   (EP) .................................. 11405313

(51) Int. Cl.
*G06Q 30/00*       (2023.01)
*B65D 23/00*       (2006.01)
(Continued)

(52) U.S. Cl.
CPC ......... *G06Q 30/0261* (2013.01); *B65D 23/00* (2013.01); *G06Q 30/02* (2013.01); *G06Q 30/0269* (2013.01)

(58) Field of Classification Search
None
See application file for complete search history.

(56) References Cited

U.S. PATENT DOCUMENTS

| 4,846,693 | A  | 7/1989 | Baer |
| 6,271,753 | B1 | 8/2001 | Shukla |

(Continued)

FOREIGN PATENT DOCUMENTS

| WO | WO 03060818   | 7/2003 |
| WO | WO 2009/136391 | 11/2009 |

OTHER PUBLICATIONS

EPO Cited Art entitled "Notice from the European Patent Office dated Oct. 1, 2007 concerning business methods"; pp. 592-593 of Amtsblatt EPA / Official Journal EPO / Journal officiel OEB, vol. 30, No. 11, dated Nov. 1, 2007.

(Continued)

*Primary Examiner* — Michael Bekerman
(74) *Attorney, Agent, or Firm* — KNOBBE, MARTENS, OLSON & BEAR LLP

(57) ABSTRACT

A system and a method for controlling an electronic device embedded in a package of a consumer product are disclosed. In one aspect, the consumer product packaging includes a bottle for a beverage, a memory, a receiver and a circuit. The memory stores an action to be performed in response to an input. The receiver receives the input indicative of movement of the bottle. The circuit retrieves the action stored in memory upon receipt of the input and command an electronic communication module to perform the action at a particular time or in a particular sequence.

20 Claims, 10 Drawing Sheets

Related U.S. Application Data application No. 14/592,794, filed on Jan. 8, 2015, now Pat. No. 11,200,600, which is a continuation of application No. 13/604,302, filed on Sep. 5, 2012, now abandoned.

(51) Int. Cl.
*G06Q 30/02* (2023.01)
*G06Q 30/0251* (2023.01)

(56) References Cited

U.S. PATENT DOCUMENTS

| | | | |
|---|---|---|---|
| 6,593,902 | B1 | 7/2003 | Ogino |
| 6,773,344 | B1 | 8/2004 | Gabai et al. |
| 7,205,903 | B2 | 4/2007 | Blum et al. |
| 7,697,925 | B1 | 4/2010 | Wilson et al. |
| 8,626,586 | B1 | 1/2014 | Biere et al. |
| 8,672,504 | B2 | 3/2014 | Kramer |
| 8,688,057 | B2 | 4/2014 | Brand |
| 9,158,333 | B1 | 10/2015 | Froment et al. |
| 2002/0000908 | A1 | 1/2002 | Burg, II et al. |
| 2004/0044574 | A1 | 3/2004 | Cochran et al. |
| 2004/0124988 | A1 | 7/2004 | Leonard et al. |
| 2005/0178034 | A1 | 8/2005 | Schubert et al. |
| 2005/0199526 | A1 | 9/2005 | Glynn et al. |
| 2006/0128447 | A1 | 6/2006 | Tischer et al. |
| 2006/0138723 | A1 | 6/2006 | Olchevski |
| 2006/0139928 | A1 | 6/2006 | Griffiths et al. |
| 2006/0273087 | A1 | 12/2006 | Crawford |
| 2007/0000849 | A1 | 1/2007 | Lutz et al. |
| 2007/0058144 | A1 | 3/2007 | Olsen et al. |
| 2007/0160373 | A1 | 7/2007 | Biegelsen et al. |
| 2008/0004950 | A1 | 1/2008 | Huang et al. |
| 2008/0035515 | A1 | 2/2008 | Dikopf |
| 2008/0191847 | A1 | 8/2008 | August et al. |
| 2008/0272916 | A1 | 11/2008 | Breysse et al. |
| 2009/0137185 | A1 | 5/2009 | Zheng |
| 2010/0161423 | A1 | 6/2010 | Nowacek |
| 2010/0167623 | A1 | 8/2010 | Eyzaguirre et al. |
| 2010/0193388 | A1 | 8/2010 | Wright |
| 2010/0278345 | A1 | 11/2010 | Alsina et al. |
| 2011/0140844 | A1 | 6/2011 | McGuire et al. |
| 2011/0145070 | A1 | 6/2011 | Wolinsky et al. |
| 2011/0188237 | A1 | 8/2011 | Griffiths et al. |
| 2011/0191172 | A1 | 8/2011 | Hostvedt et al. |
| 2011/0314711 | A1 | 12/2011 | Jumblatt et al. |
| 2012/0054787 | A1 | 3/2012 | Reichardt et al. |
| 2012/0109384 | A1 | 5/2012 | Stepanian |

OTHER PUBLICATIONS

European Search Report for Application No. EP11405313 dated Jan. 19, 2012, with EP Application.

Hu, Z., and P. H. Cole. "Bottle packaged wine product detection by UHF RFID systems." 2010 International Conference on Electromagnetics in Advanced Applications. IEEE, 2010. (Year: 2010).

International Preliminary Report on Patentability for International Application No. PCT/IL2009/000458, dated Nov. 9, 2010 corresponding to WO 2009/136391.

Written Opinion of the International Searching Authority for International Application No. PCT/IL2009/000458, dated May 3, 2009.

US 11,995,686 B2

SYSTEM AND METHOD FOR CONTROLLING AN ELECTRONIC DEVICE EMBEDDED IN A PACKAGE OF A CONSUMER PRODUCT

CROSS REFERENCE TO RELATED APPLICATIONS

This application is a divisional of U.S. patent application Ser. No. 17/644,034, filed Dec. 13, 2021, which is a continuation of U.S. patent application Ser. No. 14/592,794, filed Jan. 8, 2015, now U.S. Pat. No. 11,200,600, which is a continuation of U.S. patent application Ser. No. 13/604,302, filed Sep. 5, 2012, which claims priority benefit of European Patent Application No. 11405313.5, filed on Sep. 6, 2011. Each of the above-listed disclosures are hereby incorporated by reference in its entirety.

BACKGROUND

Field

The invention relates to a system and method for generating a database of data items indicative of synchronized actions.

Description of Related Technology

In a world of pervasive connected devices, connecting content for providing a common theme or message remains elusive. Drawing from filmmaking and interactive media, a collection of actions in a message dispersed among multiple devices over time can be likened to a storyboard or script. A storyboard in this context, may define actions, content, routines, outcomes that define a story according to a set of different actions to provide a unified presentation of a message. In one application, the storyboard may be created for putting together a presentation that may be presented to a consumer to promote a product. The storyboard may allow for helping to identify and separate the different actions or content that may be integrated together such that the final presentation may make use of different forms of actions and/or content to provide the unified presentation. To assist in generation of such a storyboard and for allowing for generation of a presentation based on the storyboard, a database of data items indicative of synchronized actions according to a storyboard will need to be generated and stored so that retrieval can be programmatically implemented at later times.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages directed to presentation synchronized actions.

In one embodiment, a consumer product packaging having an embedded electronic device is provided. The consumer product packaging includes a bottle configured to package a beverage. The consumer product packaging further comprises a memory, a receiver, and a circuit. The memory may be configured to store an action to be performed in response to an input. The receiver may be configured to receive a physical input indicative of movement of the bottle. The circuit may be configured to retrieve the action stored in the memory upon receipt of the physical input and command an electronic communication module to perform the action. The circuit may be further configured to command the electronic communication module at a particular time or in a particular sequence based on receiving the physical input. The action comprises instructions to activate a light in the bottle. The electronic communication module is configured to perform the action based on the command received from the circuit, wherein the particular time is stored in the memory and corresponds to how long to wait before performing the action after receiving the physical input.

In another embodiment, an electronic device for providing a presentation is provided. The electronic device comprises a memory configured to store at least one data item. The at least one data item is indicative of at least one action to be output by the electronic device. The at least one data item is a portion of a storyboard, where the storyboard is indicative of the presentation to promote a consumer product, and where the electronic device output is communicated to an audience. The electronic device further includes packaging of the consumer product being promoted, the packaging having an electronic communication capability. The electronic device also includes an input module configured to receive input from another electronic device or a user of the consumer product and a controller. The controller is configured to retrieve the data item from the memory, where the retrieved data item includes time synchronization information so as to synchronize the action with the received input. The controller is further configured to control the electronic communication capability to take the action so as to communicate the presentation to the audience being in proximity to the electronic device.

In another embodiment, a method of controlling a presentation by an electronic device embedded in the packaging of a consumer product is provided. The method comprises storing at least one data item, the data item indicative of at least one action to be output by the electronic device. The data item is a portion of a storyboard, where the storyboard is indicative of a presentation to promote a consumer product, and where the electronic device output is communicated to an audience. The method further includes receiving an input from another electronic device or a user of the consumer product and retrieving the data item from a memory. The retrieved data item includes time synchronization information so as to synchronize the action with the received input. The method also comprises communicating the presentation to the audience via the packaging of the consumer product being promoted. Communicating the presentation comprises taking the action and wherein the audience is proximate to the consumer product.

Figure 1:
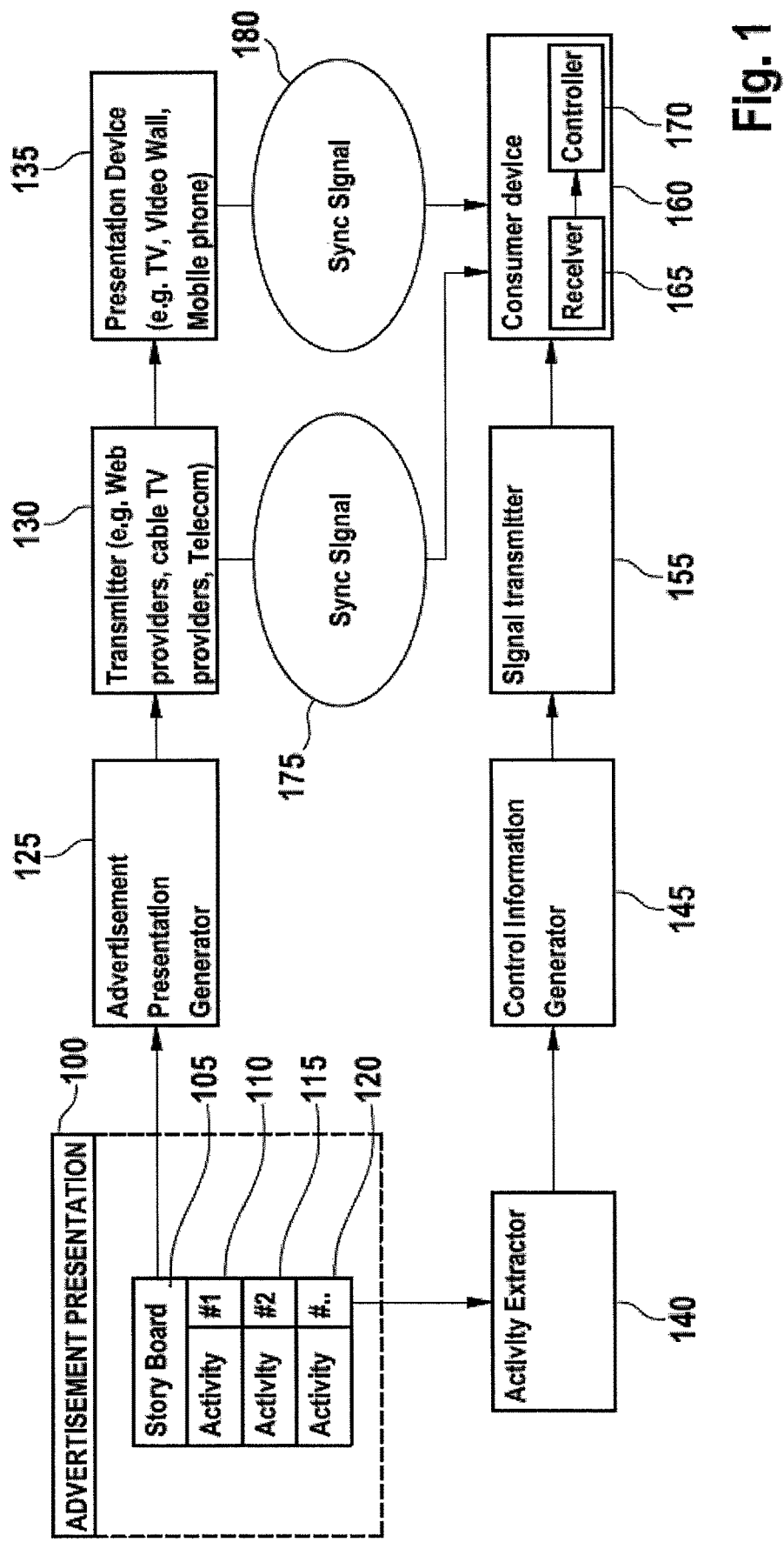
FIG. 1 is a combined block and flow diagram showing an embodiment of an advertisement system according to exemplary embodiments of the invention.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Various aspects of implementations within the scope of the appended claims are described below. It should be apparent that the aspects described herein may be implemented in a wide variety of forms and that any specific structure and/or function described herein is merely illustrative. Based on the present disclosure a person/one having ordinary skill in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

The word "exemplary" is used herein to mean "serving as an example, instance, or illustration." Any implementation described herein as "exemplary" is not necessarily to be construed as preferred or advantageous over other implementations. The following description is presented to enable any person skilled in the relevant technology to make and use the invention. The present invention is not intended to be limited by the described implementations, but is to be accorded with the widest scope consistent with the principles and features disclosed herein.

The system shown in FIG. 1 is based on a message, e.g., an advertisement 100 comprising a storyboard 105. While advertisement may be the application of a message that is generally described below, the message could be implemented in other applications. The storyboard, in addition to advertisement content like scenes, songs, etc., includes one or more activities, in the present embodiment 'Activity #1' 110, 'Activity #2' 115, and further activities 'Activity # . . . ' 120 which represent one or more actions by a consumer device wherein the consumer device preferably is part of the infrastructure underlying the storyboard and/or the target product of the storyboard. FIG. 1 shows three activities, but it naturally is not so limited in number.

The storyboard 105 of the advertisement 100 is fed into an advertisement presentation generator 125 which generates a presentation signal or data set including these activities. Such analog or digital presentation signal or data set can be an advertising movie, a picture sequence or other multimedia event, an interactive game, or purely audio, and so forth.

The presentation signal or data set is then transferred to a content transmitter 130, e.g., a web provider, cable TV provider or the like, which transmits the presentation to a presentation device 135. The presentation device 135 could be a consumer device like a television set or a radio, a personal computer, or a public presentation device like an advertisement or video wall, or a mobile device like a mobile telephone, a portable media player, a home entertainment device, a gaming device, for example. The content transmitter 130 could be a cable TV provider, radio station or a Web provider, for example.

The storyboard 105 of the advertisement 100 is further fed into an activity extractor 140 which extracts the mentioned activities from the storyboard. Based on the extracted activity items, a control information generator 145 generates a signal including content and related control and/or functional (operational) data. The related control and/or functional data represents information about consumer device actions which are executed by a consumer device 160 and which correspond to the activities 110-120 included in the storyboard 105. Possible actions by the consumer device will be described in more detail in connection with FIGS. 3-5.

The content and related control data generated by the control information generator 145 is fed into a signal transmitter 155 which communicates the content and related control data to a consumer device 160. For this transmission purpose, the consumer device 160 includes a signal receiver 165 which feeds the received signal to an action controller 170. The action controller 170 can be any suitable device that causes the consumer device 160 to move, sound or react in any other way, corresponding to an underlying activity. However, if the consumer device 160 comprises a screen (LCD or OLED display or the like) and/or a loudspeaker, an optical device (e.g., spectacle), or projection (e.g., of a vacuum or air type, or a hologram), the action controller 170 is only optional insofar as the received signal can be used to drive the screen and/or loudspeaker (or other audio device) immediately without the need of previous conversion into an appropriate signal format.

Note that the content transmitter 130 and the signal transmitter 155 are not required to be separate physical units and thus can be integrated into only one functional device or unit.

Another aspect of exemplary embodiments of the invention is that the actions by the consumer device 160 are performed synchronously or in time with the presentation of the corresponding activities being presented on the presentation device 135 so that the mentioned immersion effect, i.e., the consumer device becomes an 'immersion' based part of the advertisement presentation, becomes valid. This synchronization is achieved, for example, using a synchronization signal which may be implemented by way of a 'sync' signal 175 transmitted by the content transmitter 130 to the consumer device 160 or by way of an alternative 'sync' signal 180 being transmitted by the presentation device 135 to the consumer device 160. However, it is possible to use multiple signals together such as the 'sync' signals 175 and 180, e.g., in order to improve the quality of synchronization. In addition, other signals may be transmitted to a source of the storyboard (e.g., the presentation device 135) resulting in an action that includes data transmitted to be stored in a database to trigger a storyboard directive.

The format of the 'sync' signal can be 'Start/stop/action/time/period', or any other suitable format including such information to be needed for the underlying synchronization.

It is worthwhile to mention that the second 'sync' signal can be implemented using the content of the presentation itself, either based on visible or hidden information like hidden video frames or hidden acoustic signals, so that in such case, a separate synchronization signal transmitter is not needed.

It is further noted that the two processes via the presentation device 135 and the consumer device 160 must not necessarily be executed or performed timely correlated or parallel in time. Further, the consumer device 160 may be a generic device with particular attributes assigned during its manufacture at its production time, including alterable or dynamic physical characteristics (e.g., chemical characteristics alterable via a reaction or electrical characteristics), built-in content and functionality and operation. These attributes can be activated or modified by the control information generator 145, by the presentation device 135, or by the signal transmitter 155 and/or the content transmitter 130.

Figure 2:
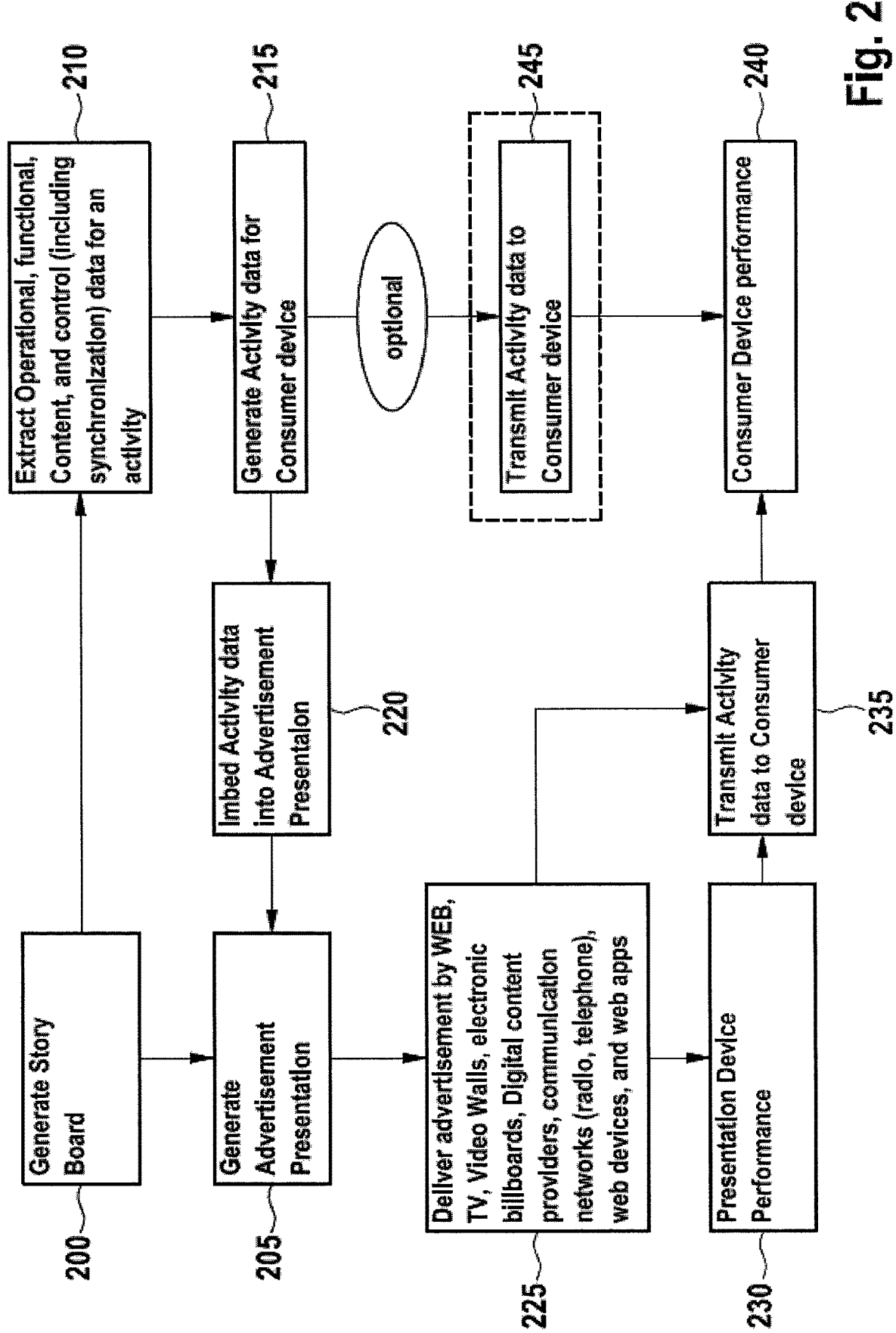
FIG. 2 is a flow diagram showing an embodiment of an advertisement process according to exemplary embodiments of the invention.

The advertisement process according to an embodiment of the invention is now described referring to FIG. 2. In a first step 200, a storyboard for a presentation is created or generated. The storyboard includes at least one previously described activity item.

Via a first branch of the overall process, in a second step 205, an advertisement presentation is generated based on the storyboard.

Via a second branch of the process, in step 210 content and related operational and functional data are extracted from the generated storyboard, including synchronization data for the activities. As already mentioned above, the second branch can be performed in parallel with the first branch, but not necessarily.

In a subsequent step 215, based on these extracted data, activity data, or an activity signal, for the consumer device are generated. In a final step 220 of the second branch, the generated activity data are embedded into the already generated advertisement presentation.

In a next step 225 of the overall process, the advertisement is delivered to the public, an individual, an enterprise, a retail establishment, as examples over the web (Internet), via dedicated web devices or web applications (or apps), e.g., using a digital content provider, or via one or more video walls, electronic billboards, or other communication networks like broadcast radio, television, satellite, GPS, or telephone networks.

The delivered advertisement then causes the presentation device to communicate a performance (step 230). In a subsequent step 235, activity data are transmitted to the consumer device, based on which the consumer device performs at least one action (step 240).

Alternatively, step 230 is optional which means that the advertisement is presented without a further performance. In such an embodiment, step 235 immediately follows step 225.

Also alternatively, instead of embedding the activity data into the advertisement presentation (step 220), the activity data generated in step 215 can be transmitted directly to the consumer device, according to optional step 245.

In various embodiments, the consumer device 160 can have attributes that are pre-assigned at manufacture time, including alterable or dynamic physical characteristics (e.g., chemical characteristics alterable via a reaction or electrical characteristics), built-in content and functionality and operation. These attributes can be set, reset, activated or modified by the advertisement delivery vehicle, by the presentation device 135, or by the control information generator 145.

Figure 3:
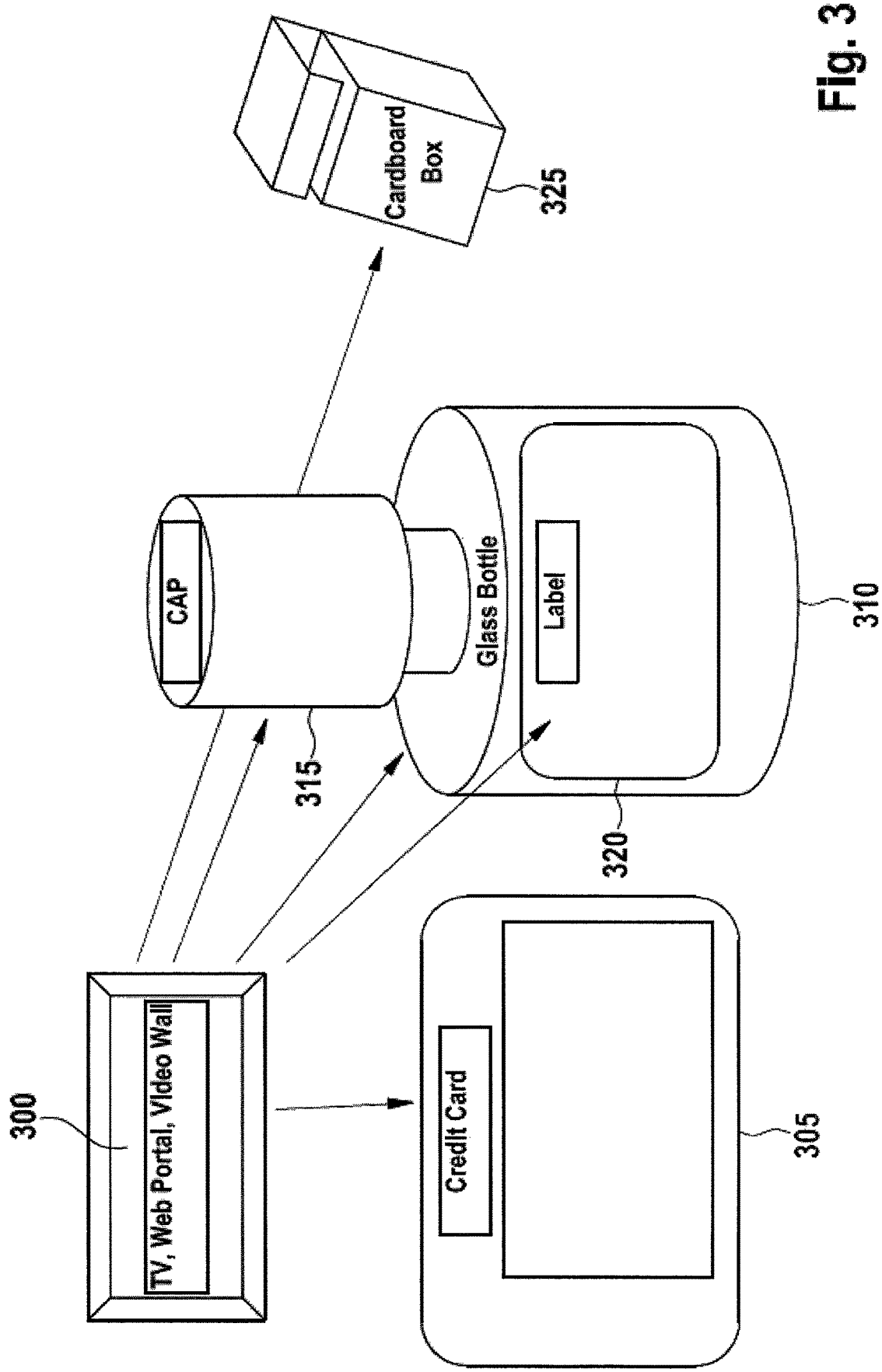
FIGS. 3, 4, 5, and 6 show different applications of exemplary embodiments of the invention.

FIG. 3 depicts an exemplary embodiment with specific devices in an advertising application of message deliver. In this embodiment, a presentation device 300 like a TV web portal or a video wall is enabled to send out the control information associated with a storyboard to a number of different consumer devices. The devices are a credit card 305, a bottle 310 including a consumable like a drink or a perfume, a cap 315 of the bottle 310, a label 320 of the bottle 310 and a cardboard box 325 e.g., of a cigarette pack.

These consumer devices 305-325 comprise native attributes, like the actual packaging material composed of glass or other materials, and one or more of the following other parts being attached to or embedded with the consumer devices, which provide multimedia functionality like an LCD screen, a sound system, a communication chip, a sensor chip, a processor and memory for executing software applications or "apps", and/or physical attributes so that the devices may change inherent characteristics like color or shape.

Figure 4:
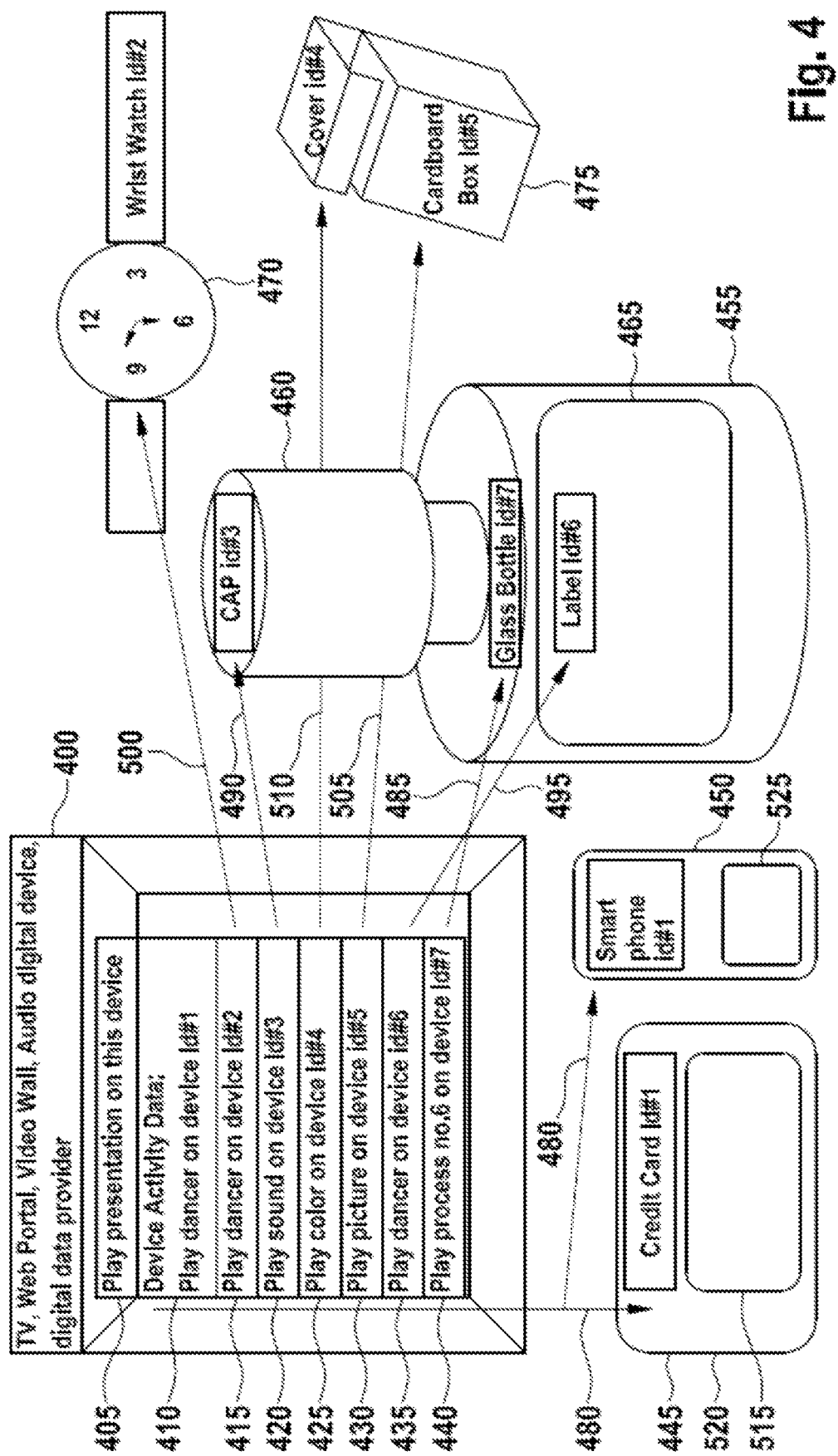

In the embodiment of FIG. 4, the presentation device 400 may be a TV web portal, a video wall, a digital audio device, or a digital data provider. The presentation is illustrated as several entries or commands 405-440 of an underlying storyboard.

The first data item 405 is a command 'Play presentation on this device' which starts the presentation on the underlying presentation device 400. The other data items 410-440 correspond to different actions of an underlying consumer device, namely 'Play dancer on device id #1' (entry '410')
'Play dancer on device id #2' (entry '415')
'Play sound on device id #3' (entry '420')
'Play color on device id #4' (entry '425')
'Play picture on device id #5' (entry '430')
'Play dancer on device id #6' (entry '435')
'Play process no. 6 on device id #7' (entry '440')

In this embodiment, the storyboard can be a complete production including audio and video events being played on all shown consumer devices 445-475 but being "orchestrated" by the presentation device 400, the corresponding underlying transmission channel 480-510 and the corresponding consumer device 445-475. In the latter example, one of the consumer devices 445-475 can control or determine the logic flow of the transmission channels 480-510 and the presentation device 400. However, there can be alternative examples where the production can be orchestrated by any of the participating consumer devices 445-475.

According to the time line of the underlying storyboard, the entries 410-440 trigger the above seven actions ('Play . . . on device . . . ') on side of the respective consumer devices 445-475 synchronously with the underlying actions item included in the storyboard.

For instance, consumer device 445, a credit card which can be addressed by id #1 and thus is intended to play a dancer according to the first entry 410, plays the dancer on a flat screen 515 disposed on the credit card's front face 520. This flat screen can be, for example, an LCD, polymer panel or any other technology based screen. A smartphone 450, having the same id #1, will play the dancer on its common touch screen 525 as well and at the same time.

As another example, a glass bottle 455 including the id #7 will play process no. 6 (according to above entry 440). This process, in the present embodiment, is pre-programmed in the consumer device, either at the time of its production or later. In the latter case the process is programmed prior to creation of the storyboard underlying the presentation.

The process no. 6 may include one or more sub-processes which can cause a change of the translucence of the bottle's material, e.g., from opaque to clear, or vice versa. Alternatively, the process or sub-process can be a flickering of one or more light emitting diodes or light reflectors being embedded in the glass. In such case, process no. 6 will be triggered and changes the bottle's material from opaque to clear. This change enables a storyboard to be presented on the consumer device wherein selected one or more pre-programmed processes can be addressed in the consumer device.

The bottle's cap 460 with id #3 plays a sound (entry 420) via a common sound chip being implemented in the cap. Further the bottle's label 465 which can be addressed via id #6 will play another dancer on a screen being implemented therein. The particular orchestration (including the contents and timing) of these different multimedia actions of the bottle 455 which happen synchronously with the underlying presentation on one or more of the mentioned presentation devices, can be used e.g., in case of beverages or perfumes. In case of perfumes, these actions may help to support a "lifestyle" message of the underlying storyboard of the advertisement presentation.

As further examples shown in FIG. 4, a wrist watch 470 with id #2 may play a dancer on a small screen being arranged e.g., on its dial or face. A card box 475 may comprise two ids, namely id #4 for its cover and id #5 for the box itself. According to entry 425, the cover will change its color and the box, according to entry 430, will present a picture on a screen being arranged e.g., on the front face of the box.

Figure 5:
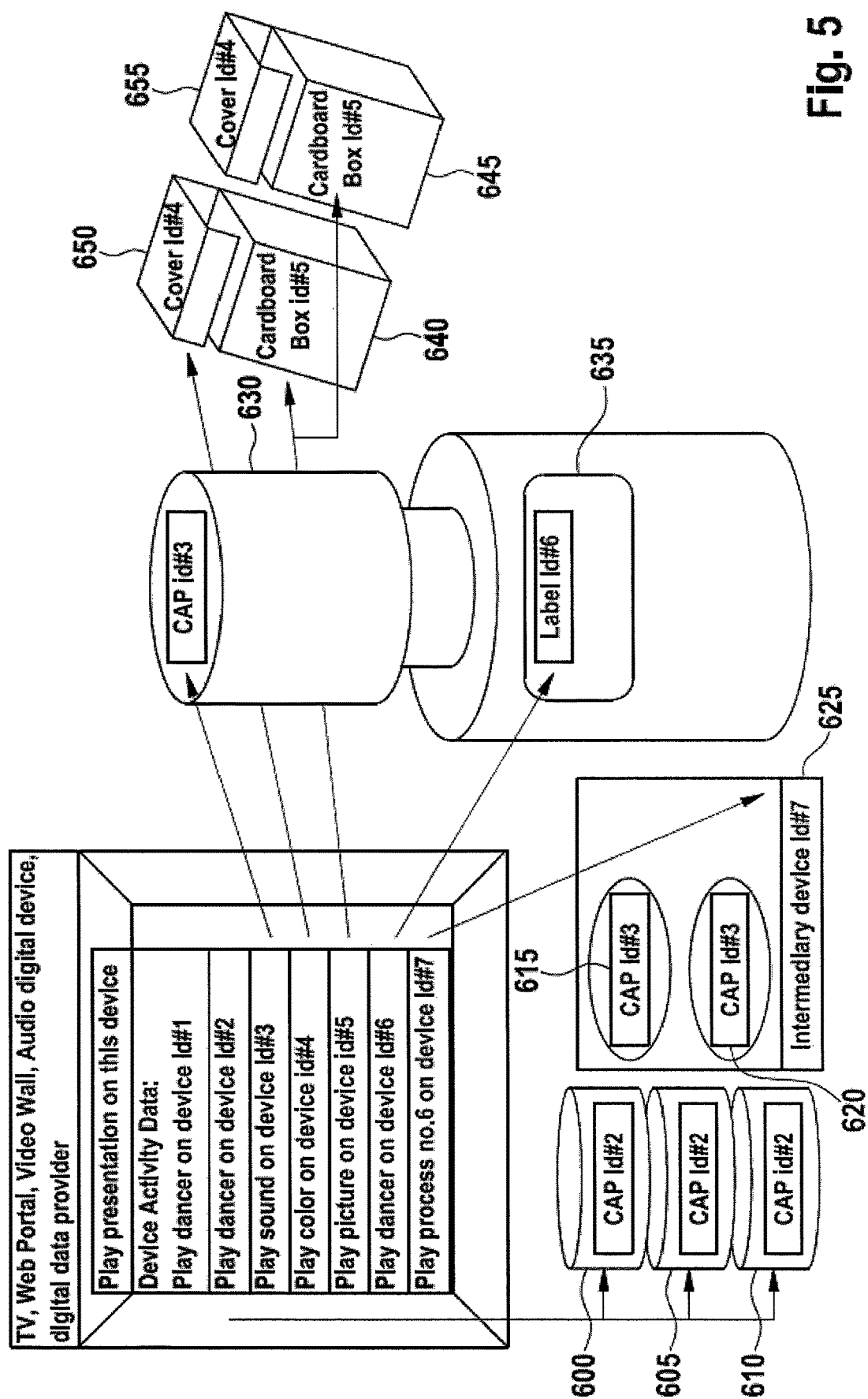

FIG. 5 shows another exemplary embodiment of devices which is based on the same storyboard as in FIG. 4, i.e., using the same entries 410-440. This example illustrates how actions of a number of consumer devices can be "orchestrated" in order to provide an above mentioned collective action, i.e., an action being performed by a multitude of consumer devices in order to enable e.g., a matrix display effect.

In the present example, three bottle caps 600-610 for the message being presented comprise the same id namely id #2 and thus will play a dancer on a small screen being arranged preferably on top of each cap. Such a synchronous dancing event will multiply the effect, in particular, because this collective action is presented synchronously with a scene of the storyboard being presented on the presentation device.

Further two caps 615, 620 are arranged as part of an intermediary device 625 which can be a consumer device itself, or a separate control device. The intermediary device 625 can group the physically independent caps 615, 620 wherein process no. 6 on device id #7 would incorporate pertinent data for the caps 615, 620. This pertinent data can be sourced either from the presentation device, the service provider, or any other suitably associated programming device.

In addition, or alternatively, the intermediary device 625 can also be used for two other purposes, namely first to communicate with the presentation device and/or service providers mentioned above, and second to orchestrate these independent consumer devices 615, 620. If more than the two caps 615, 620 are used and controlled by the intermediary device, those caps can be arranged as a tray and thus be used to form a matrix structure allowing to build a complex display, and/or other functionality, wherein each cap represents a picture element (pixel) thus enabling to play pictures of movies of this matrix display. For this purpose, the underlying consumer devices may comprise built-in capabilities like (intelligent) communication logic or physical characteristics like chemical or physical properties, e.g., to enable a chemical reaction or magnetic feedback.

This example again includes a bottle with a cap 630 and a label 635, in order to illustrate that a consumer device may include one or more individual components with assigned id #numbers which can be affected independently or be affected by interdependent processes. As an example, the bottle's cap can play a sound while a dancer is presented on the bottle's label. As another example, the dancer can be displayed as a collapsing person, if the cap has been programmed with a mono sound, or the underlying process being activated is that of a mono tone beat. In still another example, the dancer can be displayed as dancing if the bottle's cap has been programmed with an up and down beat, or the underlying process being activated is an up and down beat.

Finally, the example in FIG. 5 includes two cardboard boxes 640, 645, each having the same id #5, and corresponding covers 650, 655, each having the same id #4. These boxes 640, 645 shall illustrate how similar consumer devices receiving the same activation control can result in different processes being activated in each consumer device.

In the above description of FIG. 4 one or more of the consumer devices 445-475 can control or determine the logic flow of the transmission channels 480-510 and the presentation device 400. In order to further enhance this path of control, a back channel can be implemented for the transmission of underlying control information from the consumer device(s) to the action controller. This is illustrated in the following by way of embodiment, now referring to FIG. 6.

Figure 6:
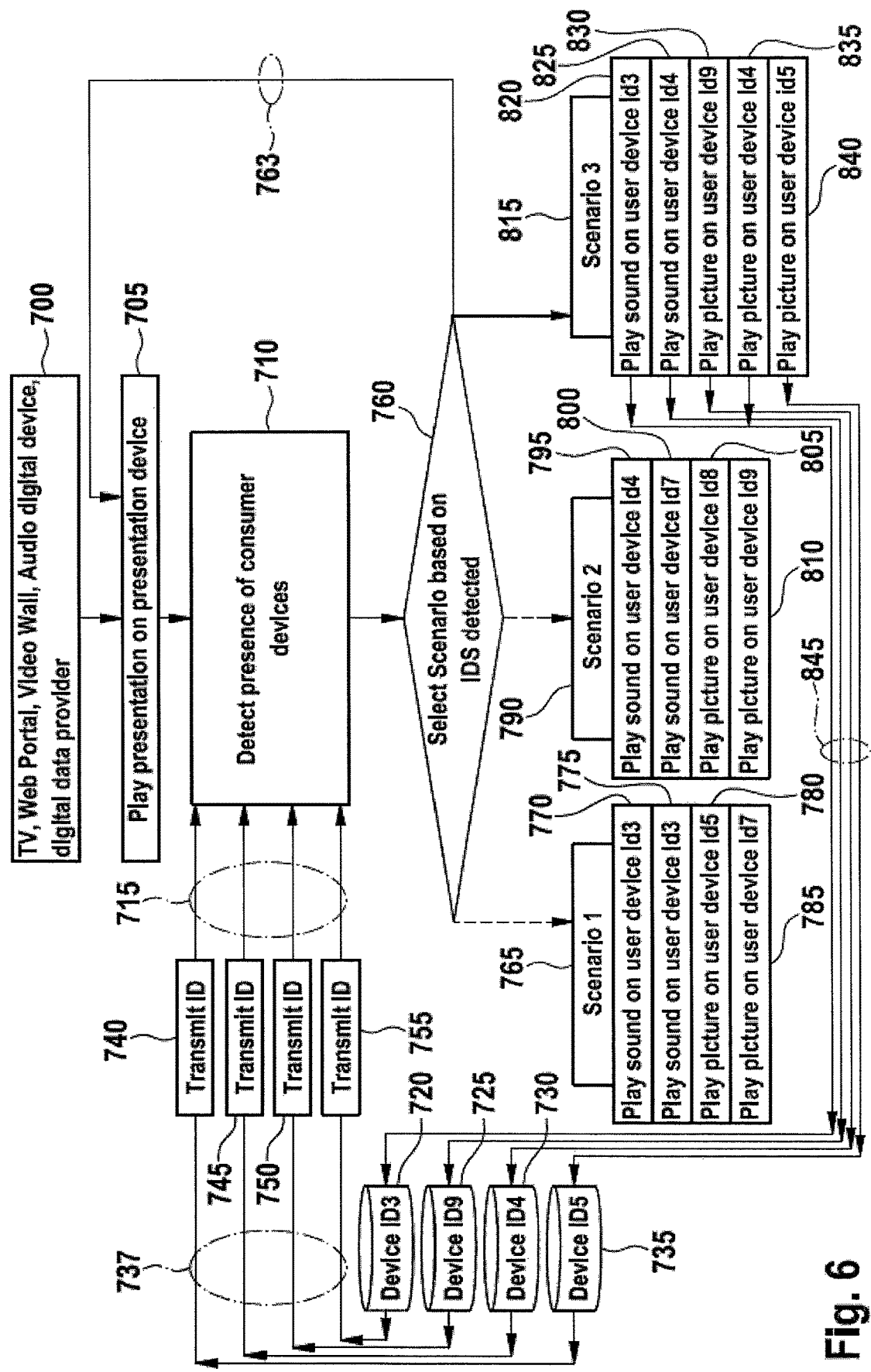

In the embodiment of FIG. 6, a storyboard is programmed with a story that can unfold and traverse different paths of action, thus activating different presentation scenarios (or scenes), and/or related command sequences, which are pertinent for the respective action by the consumer device. This enables to program storyboards based on dynamic sequences of alternative scenarios which can be selected and activated, dependent on the predetermined presence of one or more consumer devices. The underlying different actions to be executed by one or more consumer devices and the sequence of actions and underlying control commands which have to be communicated to a particular consumer device, as well as the underlying advertisement presentation to be presented on the presentation device, thus can be made dependent on the identified presence of recognized identifiable consumer devices.

As in the other embodiments, a content or data provider 700 initiates to play an advertisement presentation on a presentation device (step 705). In a different step 710, the presence of a consumer device, with an identifier IDS, is detected in order to select 760 a presentation scenario being adapted or being based on the detected consumer device. In the present embodiment, there are three different presentation scenarios 765, 790 and 815 available. 'Scenario 1' 765 comprises four activities 770-785, 'Scenario 2' 790 comprises four activities 795-810, and 'Scenario 3' 815 comprises five activities 820-840.

In addition, a selected presentation scenario 765, 790 or 815 is communicated to the presentation device via communication or control channel 763.

In the present example, by way of bold lines, it is assumed that 'Scenario 3' 815 is selected. The underlying activities 820-840 are communicated to consumer devices 720-735 via a further communication channel 845, wherein the consumer devices 720-735 will perform the underlying actions being defined in the transmitted activity items 820-840.

The above mentioned detection of the presence of a consumer device is managed via a back channel 737, 745. In this embodiment, a particular consumer device is identified by its above mentioned unique identifier ("IDS") which is transmitted 740-755 to the presence detector 710.

The above described embodiments enable advertisements to be customized in real time, i.e., the storyboard unfolds and runs its course according to the consumer devices being identified within the possible communication space (or "hot spot") of the presentation device at the time of presentation.

These embodiments further enable advertising to be adapted and targeted to a status of a product. For instance, if an empty bottle of perfume would be detected within the possible communication space, then the advertisement presentation would play a presentation sequence including a message "to replenish" the product. If, on the other hand, a full or nearly full perfume bottle would be detected, the advertisement presentation would play a different sequence, e.g., including a "message of beauty", in order to excite or stimulate the consumer to increase his or her consumption of the perfume.

In addition, these embodiments enable 'shared brand' advertising campaigns where, for example, the presence of a lemonade bottle and a cigarette pack would initiate a sequence with a message of "serenity", whereas the presence of a bottle of whiskey and a cigarette pack would initiate a sequence with a message of "prosperity".

Furthermore, these embodiments enable time information about consumer devices to be included in advertisement campaigns. For instance, consumer devices can be programmed with a physical date of its life span, so that in a case where a consumer device's life span is outdated, a sequence with a message "to update or purchase a new consumer device", can be initiated. In the latter scenario, for a particular consumer device, the actual native status of the consumable is identified and is utilized as an active part of the underlying storyboard which is adapted to its presence and life span status of the consumer device.

In accordance with other embodiments of invention, a method and system can generate a database of data items indicative of synchronized actions according to a storyboard. In an embodiment, a storyboard is generated that involves actions or content performed by packaging of a product being promoted. A set of devices, including a device that is incorporated into packaging of a product being promoted, perform various actions in a coordinated fashion defined by a storyboard to provide a presentation. A storyboard generally defines multiple actions, content, routes, and outcomes that when integrated together form a unified presentation. Data items corresponding to the parts of the storyboard may be generated in response to determining the storyboard and stored in a database. The data items may include content (e.g., audio or video files) and time synchronization information for when a device is to perform a particular action. The data items are defined such that the involved set of devices may interpret the data items and act based on the data items to perform and/or display a set of interrelated actions and content that forms a unified storyline. Although each device may perform a small portion of the storyboard, the combination of the actions and/or content provided by each device provides an overall presentation. In addition, sub storyboards may be provided for a device or a group of device that when synchronized provides an overarching storyboard that defines the presentation. As described above, the presentation may correspond to an advertisement. The actions or content may be coordinated according to synchronization data (e.g., time signals, etc. as described above) such that the storyboard may be played out in a coordinated fashion via the devices involved.

The storyboard may further be dynamic based on the types of devices involved or detected. For example, each device may have different capabilities for providing content. Upon detection of devices available via communication from those devices, a storyboard may be generated that utilizes capabilities of each of the devices detected. Actions defined as part of the storyboard may include communications between devices. For example, the devices may be able to signal their presence and in addition communicate with each other to provide signals for different outcomes or actions to trigger a subsequent action on another device or provide content to other devices. For example, in response to a device incorporated into packaging beginning to play an audio file, the packaging may communicate with another display device to initiate a video sequence that is synchronized with the audio file of the packaging which actions define a portion of the storyboard. After the storyboard is generated, the devices may receive information allowing them to play out the storyboard in a coordinated fashion.

Figure 7:
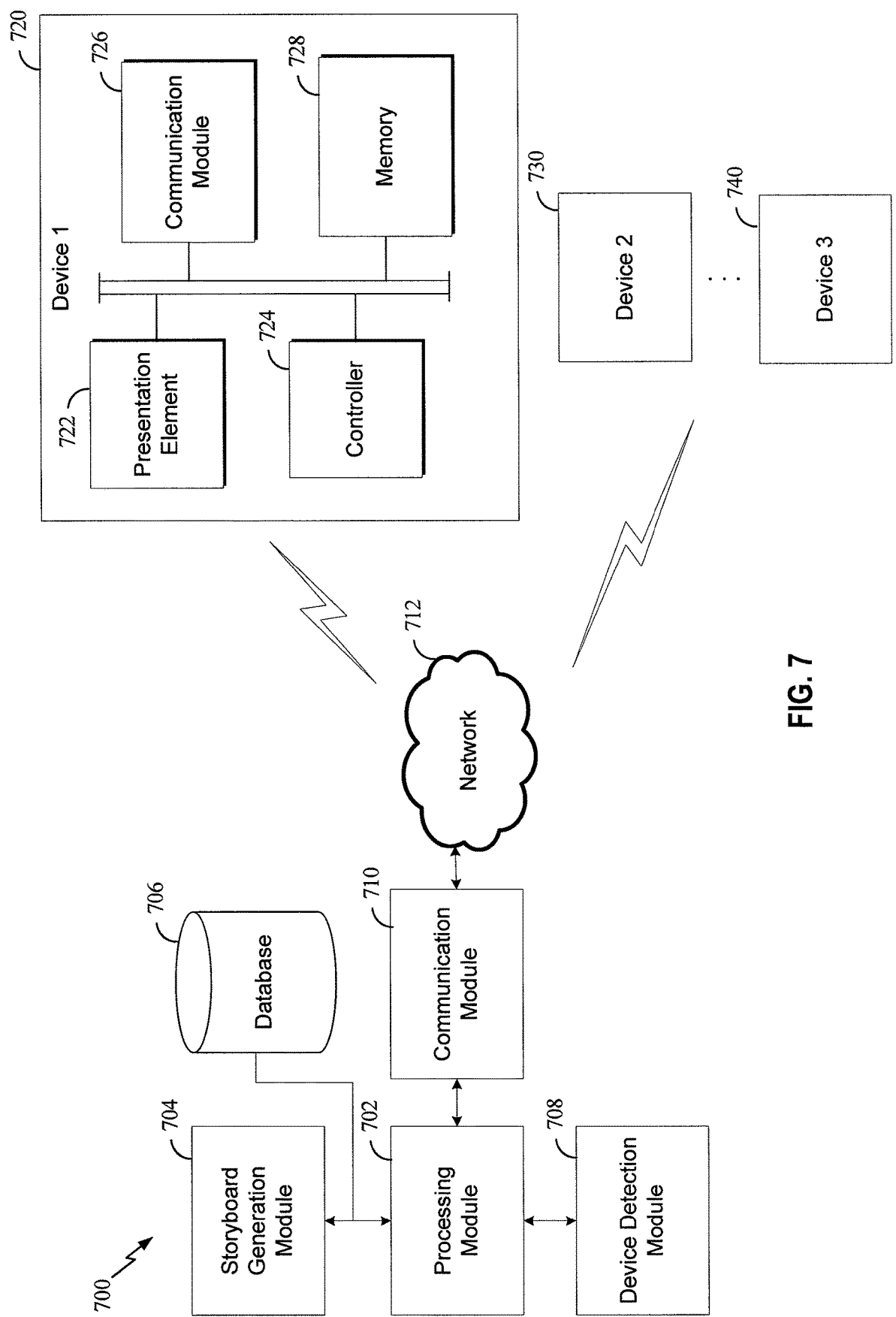
FIG. 7 is a functional block diagram of an exemplary system for generating a database of data items indicative of synchronized actions, in accordance with an exemplary embodiment of the invention.

FIG. 7 is a functional block diagram of an exemplary system for generating a database of data items indicative of synchronized actions, in accordance with an exemplary embodiment of the invention. The system 700 may provide a presentation via multiple devices 720, 730, and 740. The devices 720, 730, 740 may be one or more presentation devices such as a video display or other device capable of providing multimedia content (e.g., televisions, radios, personal computers, video walls, smartphones, tablets, active billboards, and the like). At least one of the devices 720 is a product or is integrated with packaging or a housing of the product that is being advertised by the advertisement presentation.

A device 720 includes a controller 724 configured to control an action or delivery of content by the device 720. The device 720 further includes a presentation element 722 configured to provide content or other feedback to the user. For example, the presentation element 722 may be a display configured to display images or video. The presentation element 722 may be a speaker or other device configured to provide audio content. The presentation element 722 may be a light or string of LEDs. The presentation element 722 may dispense a portion of the product (e.g., dispense a sample of perfume or lotion). The presentation element may be any type of active element that is configured to provide some sort of action or content that may form a portion of a story as part of an overall storyboard of an advertisement presentation. For example, presentation element 722 may include an active or reactive material or have LEDs, LCD screen, speakers, servos, and the like.

The device 720 may further include a communication module 726. The communication module may be configured to receive information about an action and synchronization information for performing the action. Furthermore the communication module 726 may be able to provide signaling to other devices to broadcast the presence/capabilities of the device 720 or to provide further synchronization information to other devices as described above via the "back channel."

The device 720 may further include a memory 728. The memory 728 may be programmable and be further configured to store information relating to an action to perform or content to provide. The memory 728 may be configured to store content such as a multimedia file. The memory 728 may be configured to store time synchronization information relating to an action. The memory 728 may be configured to store a sub storyboard comprising a set of actions for performing by the device 720 via the presentation element 722. For example, a data item for a storyboard may provide information such that the controller 724 dynamically provides content based on detected conditions, outcomes, and capabilities of surrounding devices. This allows for adapting to dynamic storyboards that provide several different outcomes and or story lines based on detected conditions or feedback from the user.

As such, the device 720 may be provided to perform an action and/or to provide content that form a part of an overall story provided by a storyboard. The presentation element device 720 along with the communication module 726, the controller 724, and the memory 728 may be a part of or be a component within packaging of a product such as within a credit card, bottle, a cap, a label, a cardboard box as described above. The device 720 may be integrated with packaging or integrally formed as a portion of the packaging.

To generate and provide the storyboard, system 900 includes a processing module 704, a storyboard generation module 704, a communication module 710, a device detection module 708, and a storage device 706. It should be appreciated that the storyboard generation module 704 and the device detection module 708 may form part of or whose functions may be performed by the processing module 704. The device detection module 708 may be able to determine and/or detect a set of devices 720, 730, 740 for providing a presentation. The device detection module 708 may be configured to receive information from the devices 720, 730, and 740 via the communication module 710 via a network 712. The network 712 may comprise any type of network such as the Internet, a local area wireless network (WLAN), a cellular network, a fixed line communication network, satellite, and the like.

Based on information from the device detection module 708, the storyboard generation module 704 may generate a storyboard based on the types and capabilities defined by the device detection module 708. The storyboard may be defined by set of actions corresponding to stories, content, routes, and the like. The storyboard generation module 704 may generate the storyboard to allow for dynamic storylines that may be adapted in real time based on detected conditions such as a geographic location, consumer preferences, and preferred parameters such as religion, political, environmental, and social concerns as well as business dependencies and policies. The storyboard generation module 704 may generate data items corresponding to the set of actions/content. The data items may include time synchronization information for the set of actions of different devices 720, 730, and 740. The storyboard generation module 704 may receive user input to define one or more of the actions.

A data item that includes time synchronization information may comprise different types of information that indicate a time for performing an action. For example, the time synchronization information may be in the form of a time stamp such as an STMP time stamp. In addition, other offset time information may be included. Furthermore, information for how long to wait after another trigger message may be included, and the like.

The data items are collectively stored in a database 706. The database 706 may be implemented using relational databases, flat file systems, and/or other types of structured data storage systems that use storage devices (e.g., disk drives, solid state memories, etc.) to store data. Each illustrated database 706 may include multiple distinct databases, each of which stores a different data item. Furthermore, the database 706 is typically located on a server (not shown) and accessed via the network 712.

A processing module 702 may be provided that may coordinate the activities of the storyboard generation module 704, the device detection module 708, the database 706, and the communication module 710. The processing module 702 may receive data items from the storyboard generation module and provide them to the database 706 for storage. The processing module 702 may further receive user input for defining the storyboard and/or determining devices available. When a presentation is executed, the processing module may retrieve data items from the database 706 and provide them to the devices 720, 730, and 740 via the communication module 710. The processing module may take part in performing one or more of the actions such as transmitting time synchronization information according to the data items to help coordinate the performance of actions to play out the storyboard. In addition, the processing module may receive message from the devices 720, 730, and 740 to further trigger other actions. As such, in one aspect, the system 700 may allow for generating a storyboard for performing actions on a set of devices including packaging of a consumer product being promoted.

Figure 8:
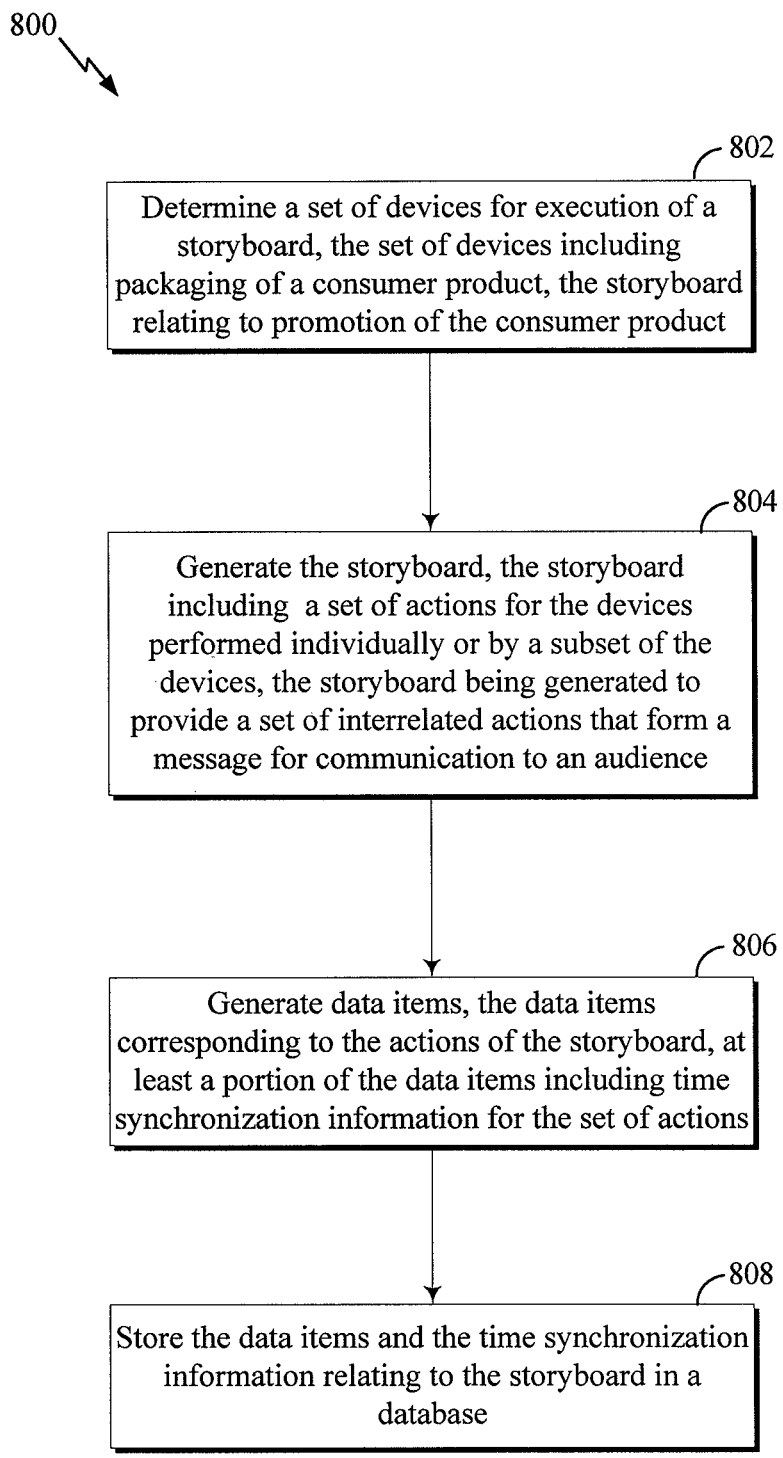
FIG. 8 is a flowchart of an exemplary method of generating a database of data items indicative of synchronized actions, in accordance with an exemplary embodiment of the invention.

FIG. 8 is a flowchart of an exemplary method 800 of generating a database of data items indicative of synchronized actions, in accordance with an exemplary embodiment of the invention. At block 802, a set of devices are determined for execution of a storyboard. The set of devices includes packaging of a consumer product. In one application, the message defined by the storyboard relates to promotion of the consumer product. For example, the storyboard may relate to an advertisement presentation. The set of devices may include a variety of types of devices as described above. As one example, one of the devices may correspond to the device 720 shown in FIG. 7. The packaging may further comprise components, for example, as shown in the device 720 of FIG. 7 to provide an active element that provides feedback to a user for presentation within the storyboard. Determining the set of devices may include receiving communications from one or more devices indicating presence in a specific location or other information regarding device capabilities. Furthermore, determining may also include receiving user input to define the set of devices.

At block 804, a storyboard is generated. The storyboard includes a set of actions for the devices determined at block 802. The actions may be provided to be performed individually by a device or by a subset of the devices. The storyboard is generated to provide a set of interrelated actions that form a message for communication to an audience. The storyboard may include various stories, content, routes, and outcomes that may be further defined by the different actions. In addition, sub-storyboards may be defined for a particular device or group of devices of the set of devices that define actions that form the overall storyboard. The set of actions may define communications between two devices. In this way, further synchronization as described above between devices for performing various actions such as for indicating presence and for providing feedback between the devices to trigger various actions or provide additional content for presentation. In one aspect, generating the storyboard may include receiving user input to define various actions, content, stories, routes, outcomes, and the like. The storyboard may further be dynamic such that the set of actions defined by change or be configured to perform differently based on a detection of some condition. For example, the storyboard execution may be based on at least one of a geographic location, a received consumer preference (e.g., a user input), and a business purpose as described above. As such, in one aspect, generation of the storyboard may be done concurrently with playing out the storyboard such that set of actions are determined dynamically in real-time.

At block 806, data items are generated that correspond to the set of actions defined by the storyboard. At least a portion of the data items include time synchronization information for the set of actions. The time synchronization information includes a particular time or sequence in which an action is performed by a device. The data items may include content or pointers to content such as audio or video files or the like. At block 808, data items and the time synchronization information related to the storyboard is stored in a database. As described above, in one aspect, storing data items in the database for generation of the storyboard may be done, in some cases, as the storyboard is being executed by the one or more devices.

Figure 9:
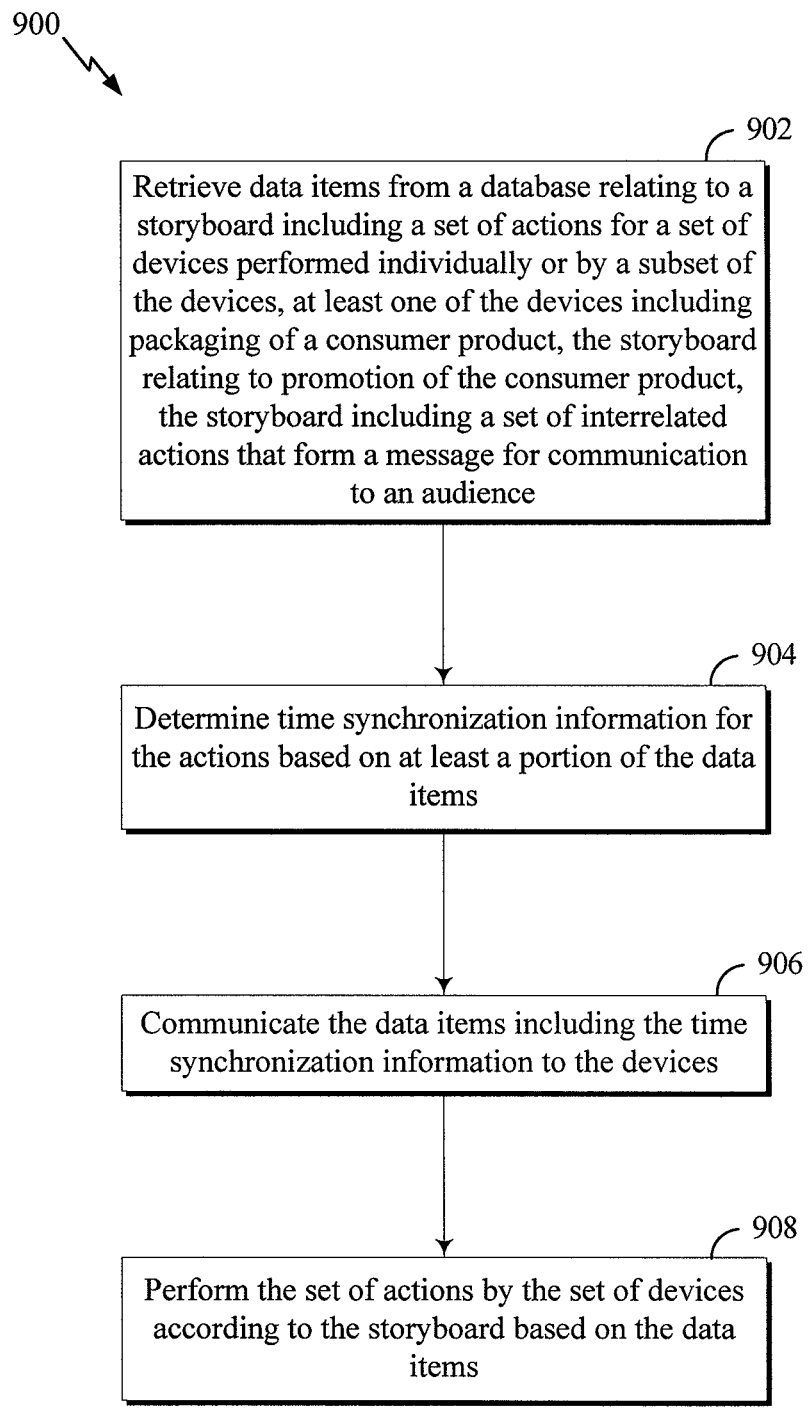
FIG. 9 is a flowchart of an exemplary method of retrieving data items indicative of synchronized actions from a database, in accordance with an exemplary embodiment of the invention.

FIG. 9 is a flowchart of an exemplary method 900 of retrieving data items indicative of synchronized actions from a database, in accordance with an exemplary embodiment of the invention. At block 902 data items are retrieved from a database that relate to a storyboard including a set of actions for a set of devices performed individually or by a subset of the devices. At least one device of the set of devices includes packaging of a consumer product. The storyboard relates to promotion of the consumer product. The storyboard provides a set of interrelated actions the form a message for communication to an audience. For example, the storyboard may define an advertisement presentation. Retrieving data items from the database may include retrieving the data items based on detection of what devices are included in the set of devices and their capabilities. In this way, the storyboard may provide a dynamic mechanism to define actions based on detected devices. Furthermore, retrieving data items may be based on detected conditions, such as a particular geographic location such that the data items retrieved are dynamically chosen based on detected conditions as described above. In this aspect, the storyboard provides for data items for different geographic locations for dynamic generation of content/actions or based on user input or user presence detection.

At block 904, time synchronization information is determined for the set of actions based on at least a portion of the data items. For, example, a data item may define a specific time for performing an action defined by the storyboard. At block 906, data items including the time synchronization information may be communicated to the devices for execution. The information and data items may be stored in a programmable memory in a device such as the device 720 of FIG. 7. In this way, the data items may provide a programmable and dynamic set of actions that are performed by the device 720 based on detected conditions or based on signals from an external control module. In this aspect, the data items provided to a device or a group of devices may correspond to a sub-storyboard synchronized with the overall storyboard. At block 908, the set of actions are performed by the set of devices according to the storyboard. In one aspect, the devices may communicate with each other and a control module to provide different feedback and triggering mechanisms for coordinating the actions to provide the storyboard.

With reference to the methods and embodiments described above, it should be appreciated that in some embodiments, the progression of the storyboard provides for ongoing back and forth interaction between the database and the "performance of the storyboard" by the participating devices. This allows for external conditions to dynamically define how the storyboard is provided to present the message. For example, information relating to environmental attributes, geographical attributes, device presence detection, and human interaction may passively or actively impact the how the storyboard is defined to dynamically communicate the message to an audience. Accordingly, a variety of types of interactions may be incorporated into the storyboard including natural elements, physical elements, or virtual elements that might trigger a device action. For example, devices might be activated, re-positioned, or changed in any manner directly or indirectly via the storyboard. These interactions may be communicated and stored in a database for retrieval for different types of performances. The performances may be online, real-time, or delayed, for example, and therefore generation of the storyboard, including storage and retrieval of data items relating to the storyboard, may be ongoing and expanded during the storyboard performance.

In addition, a storyboard may allow for interactive communication with the devices. In one aspect, a user or any other living creature is also defined as a device in the context of a storyboard or data items may be generated that correspond to actions/feedback by and from a user. A user, for example, is part of the storyboard either by active interaction (for example by keyboard input), package or product or device positioning, physical movement, or passive interaction by mere presence.

In addition, defining a storyboard may further include integrating other storyboards, from other sources. For example, a storyboard may integrate customized storyboards defined by other services and product suppliers. These customized storyboards may include online or offline data orientated communication with devices defined in the customized storyboard. Integrated storyboard information can be used by all participating storyboards and stored for retrieval.

In one aspect, the storyboard provides a unique function whereby the storyboard becomes a virtual platform for presenting a message for promoting a service or consumer product. For example, a user may generate a product, service information, or other form of a service or product that is defined by a storyboard. Based on this storyboard, which may be based on rules and other data stored in a database or inherent in the storyboard actions, a user may extend or incorporate the storyboard into an active storyboard. For example, another company might promote another product or service that may provide a way to use or experience the product generated by the user. The company's product may further be defined by an active storyboard. The storyboard of the company's product can be extended to incorporate the storyboard of the user. As such, the user may be able to market their product in conjunction with the product of the company which also enhances the exposure and use of the product of the company. In other words, storyboards may be defined such that a storyboard defined by one entity may be integrated into a storyboard of another entity to allow for promoting services/products of both entities within a message. In this way, for example, storyboards defined for several distinct consumer products may be organized in a way such that they can be integrated into an overall storyboard that provides a message for promoting all the consumer products involved. In one aspect, each storyboard that is integrated may be referred to as a sub-storyboard.

It should be further appreciated that storyboards may be defined by games where devices, packaging materials or the materials objects themselves are game pieces. It should be further appreciated that storyboards may be defined so that they play out in a number of geographical and physical and virtual locations with a number of participating devices as described above. The message communicated via the storyboard may be dependent on a number of storyboards defined by geographical and virtual environments Furthermore, a storyboard may morph, extend, or connect different currently independent advertising platforms. For example, the passive packaging (label, wall, billboard, container, newspaper, magazine, and the like) of the product may be connected with an active transmitted advertisement (radio, TV, internet, billboards) into one platform with complimentary/supplementary roles and interaction and actions that are dynamically managed by the storyboard.

Figure 10:
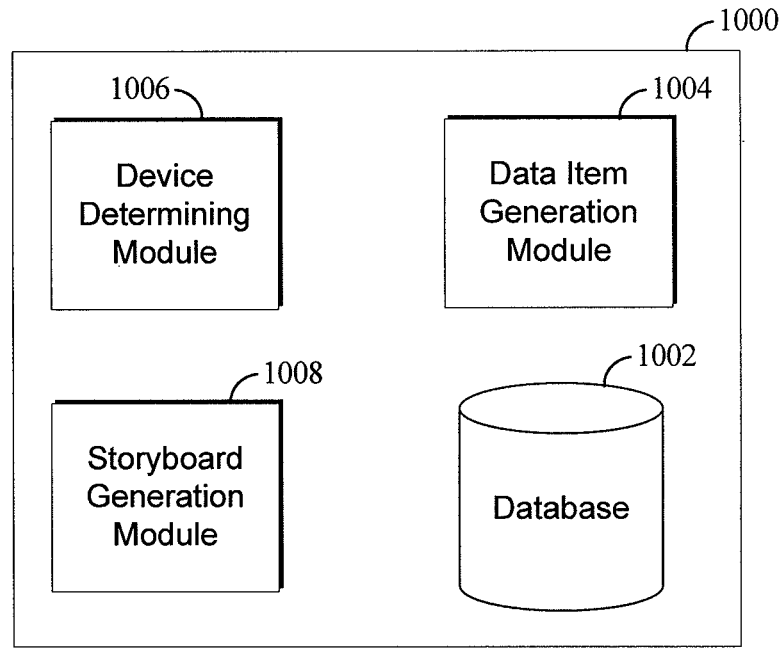
FIG. 10 is a functional block diagram of another exemplary system of generating a database of data items indicative of synchronized actions, in accordance with an exemplary embodiment of the invention.

FIG. 10 is a functional block diagram of another exemplary system 1000 of generating a database 1002 of data items indicative of synchronized actions, in accordance with an exemplary embodiment of the invention. The generation system 1000 may include a device determining module 1006 configured to determine a set of devices for execution of a storyboard. The device determining module 1006 may be configured to perform one or more of the functions described above with respect to block 802 of FIG. 8. The set of devices includes packaging of a consumer product. The storyboard relates to promotion of the consumer product. They generation system 1000 may further include a storyboard generation module configured to generate the storyboard. The storyboard includes a set of actions for the set of devices which may be performed individually or by a subset of the devices. The storyboard is generated to provide a set of interrelated actions that form a message for communication to an audience. The storyboard generation module 1008 may be configured to perform one or more of the functions described above with respect to block 804 of FIG. 8. The generation system 1000 further includes a data item generation module 1004. The data item generation module 1008 may be configured to perform one or more of the functions described above with respect to block 806 of FIG. 8. At least a portion of the data items include time synchronization information for the set of actions. The generation system 1000 further includes a database 1002 configured to store the data items and information related to the storyboard. The database 1002 may be implemented using relational databases, flat file systems, and/or other types of storage systems that use storage devices (e.g., disk drives, solid state memories, etc.) to store data. The database 1002 may include multiple distinct databases, each of which stores a different data item.

Figure 11:
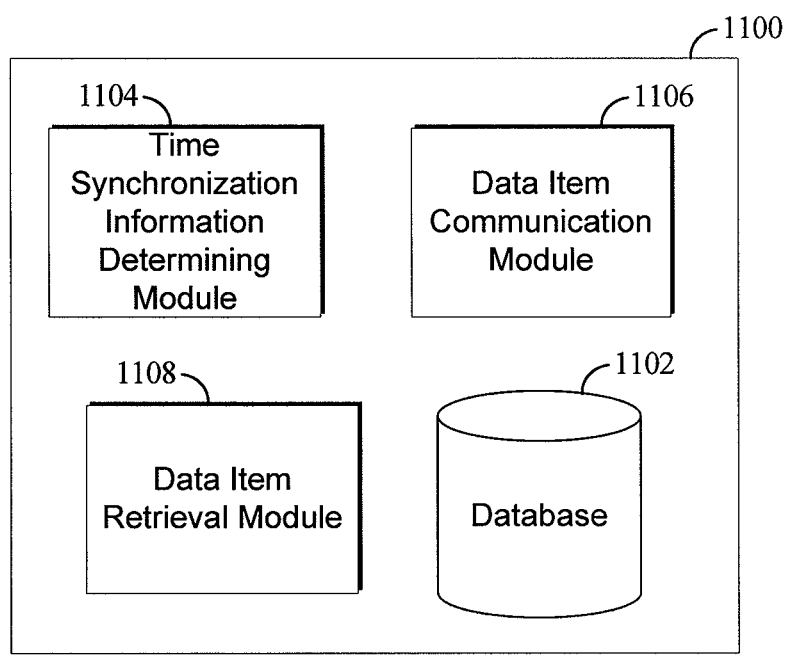
FIG. 11 is a functional block diagram of an exemplary system of retrieving data items indicative of synchronized actions, in accordance with an exemplary embodiment of the invention.

FIG. 11 is a functional block diagram of an exemplary system 1100 of retrieving data items indicative of synchronized actions, in accordance with an exemplary embodiment of the invention. The system 1100 includes a database 1102 configured to store data items that relate to a storyboard including a set of actions for a set of devices performed individually or by a subset of the devices. The database 1102 may be implemented using relational databases, flat file systems, and/or other types of storage systems that use storage devices (e.g., disk drives, solid state memories, etc.) to store data. The database 1102 may include multiple distinct databases, each of which stores a different data item. At least one device of the set of devices includes packaging of a consumer product, the storyboard relates to promotion of the consumer product. The storyboard provides a set of interrelated actions the form a unified story. For example, the storyboard may define an advertisement presentation. The system 1100 retrieves data items from the database 1102. This may correspond to one or more of the functions described with respect to block 902 of FIG. 9.

The retrieval system 1100 includes a time synchronization determining module 1104 configured to determine time synchronization information for the set of actions based on at least a portion of the data items. For, example, a data item may define a specific time for performing an action defined by the storyboard. The time synchronization determining module 1104 may be configured to perform one or more of the functions described at block 904 of FIG. 9. The retrieval system 900 may further include a data item communication module 1106 that is configured to communicate the data items to the set of devices. The data item communication module 1106 may perform one or more of the functions of block 906 of FIG. 9. A control module (not shown, but such as a processing module 702 of FIG. 7) may further coordinate actual playback of the storyboard on the set of devices.

Known advertisement systems using presentations, like movies, picture sequences or other multimedia content, which are presented on presentation devices, do not involve or immerse the consumer of an advertised consumer device so that the consumer and/or the consumer device do not become part of the advertisement or the underlying storyboard.

It is therefore desirable to provide an advertisement system which overcomes these drawbacks and provides immersion of a consumer or an advertised consumer device.

To overcome these drawbacks, an advertisement system according to certain embodiments of the invention comprises a control information generator for generating first control information for at least one activity item of an advertisement presentation and a presentation device for presenting the advertisement presentation. The system further includes at least one consumer device which comprises a receiver for receiving the first control information and an action controller for controlling at least one action by the consumer device, based on the received first control information, wherein an action corresponds to a respective activity item of the advertisement presentation.

An advertisement system may include detection means for detecting the presence of a consumer device and selection means for selecting an advertisement presentation scenario based on at least one detected consumer device. The detection means may transmit information about the status of the at least one consumer device.

The presentation device may be a television set, a radio, a video wall, another device for broadcast audio and visual information, or a combination of such devices thus enabling more complex advertising events. The consumer device may be any apparatus or device which may perform an action, like electronic and/or mechanical devices, or the packaging of such devices, or of consumables like beverages, perfumes or cigarettes.

An action by the consumer device can be any visual or audible event, or combination of those, or a mechanical action or other effect that may be used to give the consumer the suggestion that he, and/or the consumer device, are an immersion based part of the underlying storyboard of the presentation, or at least part of it. The proposed advertisement system thus has the advantage that a real action of the consumer device which corresponds to the underlying content or storyboard of the presentation helps the consumer and/or consumer device to become much more involved with the presentation thus increasing the advertising effect or efficiency.

In order to enable consumer device actions to happen synchronously, or at least nearly synchronously, with activity items of the underlying advertisement presentation, the first control information may include time information concerning the timing of an action of the consumer device in relation to the corresponding activity item. In particular, the start of an action of the consumer device may be triggered using this time information.

The advertisement system according to exemplary embodiments of the invention may further comprise a transmitter for transmitting the advertisement presentation to the presentation device and/or the first control information to the at least one consumer device. The transmitter preferably is a wireless transmitter and enables particularly the consumer device to communicate independent of its location, thus improving the inventive immersion effect. However, the transmitter can also be a wired connection, e.g., a power-line based transmission, an optical transmission line, or the like.

The action controller of the advertisement system may generate a time reference signal regarding the timing of the at least one activity within the advertisement presentation. The action controller then may transmit the time reference signal to the at least one consumer device so that the consumer device can act synchronously with the presentation storyboard.

The at least one consumer device may comprise a receiver for receiving the first control information or the time information and an actor for performing an action by the consumer device, controlled by the received first control information or the time information. In this embodiment, the actions of the consumer device can be started more autonomously thus increasing the immersion effect.

The advertisement system may further comprise a back channel for transmitting second control information from the at least one consumer device to the action controller, in order to enable also interaction by the consumer with the advertisement presentation thus further increasing the immersion effect.

The back channel thus enables advertisements to be customized in real time, e.g., by way of controlling a storyboard based on information being transmitted via the back channel to the action controller.

The back channel can be further used to detect the presence of a consumer device and to select an advertisement presentation scenario (or scene) based on at least one detected consumer device thus enabling to select a scenario for the advertisement presentation which focuses on a consumer devices being present on side of the consumer.

In addition, information about the status of one or more consumer devices can be transmitted using the back channel in order to allow to select a given scenario which relates to such device status. The device status can be the charging or filling level of a consumable of the consumer device, e.g., a beverage bottle, perfume bottle or cigarette pack, or a consumer device's life span.

Exemplary embodiments of the invention also relate to a consumer device for performing an action based on an advertisement presentation, wherein the device comprises a receiver for receiving control information representing at least one activity item within the advertisement presentation. The control information includes time information concerning the timing of the at least one action within the advertisement presentation. The consumer device further includes an actor for performing an action by the consumer device which corresponds with the underlying activity, based on the received control information, wherein an action is triggered based on the time information included in the received control information.

Instead of, or in addition to, the consumer device, the packaging of the consumer device itself may perform an action. The packaging can be product label, or in case of a bottle, a bottle cap. Further examples of exemplary packaging or devices that may perform an action in conjunction with a storyboard as described above may be found in International Patent Application No. PCT/IL2009/000458 (Published as WO 2009/136391), entitled "METHOD AND SYSTEM PROVIDING A FUNCTIONAL ASSEMBLY OF ELEMENTS," filed May 3, 2009, the disclosure of which is hereby incorporated by reference in its entirety.

According to another aspect of exemplary embodiments of the invention, consumer devices, or the packaging thereof, can be collected by the consumer thus enabling collective actions of these. For instance, a collective effect can be a pixel array to be composed of a multitude of bottle caps or labels.

Exemplary embodiments of the invention further relate to a method for immersive advertising based on at least one consumer device wherein this method comprises the steps of preparing a storyboard which includes at least one activity, generating an advertisement presentation based on the storyboard, generating control or time information for the at least one activity within the advertisement presentation, providing the control or time information to the at least one consumer device, and performing an action by the consumer device, based on, or triggered by, the control or time information.

The story board may include at least two advertisement presentation scenarios and wherein the advertisement presentation is customized in real time using these scenarios, based on information being transmitted by the at least one consumer device. The presence of at least one consumer device may be detected and an advertisement presentation scenario is selected based on at least one detected consumer device. Information about the status of at least one consumer devices is transmitted and an advertisement presentation scenario is selected based on the transmitted consumer device status.

Although described separately, it is to be appreciated that functional blocks described with respect to FIGS. 1-11 need not be separate structural elements. For example, the functional blocks may be embodied on a single chip or within a single controller. Similarly, one or more of the functional blocks or portions of the functionality of various blocks may be embodied on a single chip or a single controller. Alternatively, the functionality of a particular block may be implemented on two or more chips.

One or more of the functional blocks and/or one or more combinations of the functional blocks may be embodied as a general purpose processor, a digital signal processor (DSP), an application specific integrated device, discrete gate or transistor logic, discrete hardware components, circuitry or any suitable combination thereof designed to perform the functions described herein. In this specification and the appended claims, it should be clear that the term "circuitry" is construed as a structural term and not as a functional term. For example, circuitry may be an aggregate of circuit components, such as a multiplicity of integrated circuit components, in the form of processing and/or memory cells, units, blocks, and the like, such as shown and described in the Figures. One or more of the functional blocks and/or one or more combinations of the functional blocks described may also be implemented as a combination of computing devices, e.g., a combination of a DSP and a microprocessor, a plurality of microprocessors, one or more microprocessor in conjunction with a DSP communication, or any other such implementation.

If implemented in software, the functions may be stored on or transmitted over as one or more instructions or code on a computer-readable medium. The steps of a method or algorithm disclosed herein may be implemented in a processor-executable software module that may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium that may be incorporated into a computer program product.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may include one or more elements.

A person/one having ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

A person/one having ordinary skill in the art would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, that may be designed using source coding or some other technique), various forms of program or design code incorporating instructions (that may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein and in connection with FIGS. 1-11 may be implemented within or performed by an integrated circuit (IC), an access terminal, or an access point. The IC may include a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. The logical blocks, modules, and circuits may include antennas and/or transceivers to communicate with various components within the network or within the device. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such implementation. The functionality of the modules may be implemented in some other manner as taught herein. The functionality described herein (e.g., with regard to one or more of the accompanying figures) may correspond in some aspects to similarly designated "means for" functionality in the appended claims.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

What is claimed is:

1. A system for presenting a synchronized presentation, the system comprising:
   a plurality of electronic devices integrated in packaging of products, wherein each of the plurality of electronic devices comprise:
      a non-transitory computer-readable medium configured to store instructions for a plurality of elements associated with a storyboard that defines actions to provide a presentation of a message across the plurality of electronic devices, each element defining a portion of message content of the storyboard and an activity, the activity including:
         at least one device identifier identifying electronic devices of the plurality of electronic devices, and
         an action defining how the portion of message content is presented by the identified electronic device;
      an output component configured to perform at least one activity of the message;
      an electronic communication module configured to receive input communicated from at least one other electronic device of the plurality of electronic devices, and further configured to send output to at least the presentation device;
      a sensor configured to provide a signal indicative of a detected condition; and
      one or more computer processors configured to execute computer-executable instructions to cause the electronic device to at least:
         select an activity, from the plurality of activities, based on the signal and the device identifier of the activity, and
         perform the selected activity on the output component of the identified electronic device;
   a presentation device comprising:
      a non-transitory computer-readable medium configured to store instructions for performing the selected activity,
      one or more computer processors configured to execute computer-executable instructions to cause the presentation device to at least perform the selected activity,
      an electronic communication module configured to receive input from at least one of the electronic devices, and further configured to send output to at least one of the electronic devices, and
      an output component configured to perform the selected activity.

2. The system of claim 1, wherein the output component of an electronic device comprises at least one of: a display, a speaker, or a motor configured to move or vibrate the electronic device.

3. The system of claim 1, wherein the electronic communication of the presentation device is further configured to receive input from at least one presentation device; and further configured to output to at least one presentation device.

4. The system of claim 1, wherein the condition comprises at least one of: a presence of the presentation device, a location of the presentation device, a movement of the presentation device, an environmental attribute, a location of the electronic device, or a human interaction.

5. The system of claim 1, wherein the presentation device is one of: a television, radio, mobile telephone, portable media player, gaming device, personal computer, or home entertainment system.

6. A method providing a presentation by a plurality of electronic devices integrated in packaging of products, the method comprising:
   storing, by a non-transitory computer-readable medium, a plurality of elements associated with a storyboard that defines actions to provide a presentation of a message across the plurality of electronic devices, each element defining a portion of message content of the storyboard and an activity, the activity including:
      at least one device identifier identifying electronic devices of the plurality of electronic devices, and
      an action defining how the portion of message content is presented by the identified electronic device;
   detecting, by a sensor of at least one of the plurality of electronic devices, a condition, wherein the condition is used to select an activity from the plurality of activities;
   selecting at least one of the activities, based in part on the detected condition;
   transmitting, from the detecting electronic device to a second device of the plurality of electronic devices integrated in packaging of products and to a presentation device, a synchronization signal, wherein the synchronization signal comprises the detected condition, a receiving device identifier indicating one or more of the plurality of electronic devices intended to perform the selected activity, and a detecting device identifier identifying the electronic device of the plurality of electronic devices detecting the condition; and
   performing the action of the selected activity by the one or more of the plurality of devices intended to perform the selected activity.

7. The method of claim 6, wherein the condition comprises a performance of an element by the presentation device.

8. The method of claim 6, wherein the synchronization signal further comprises timing information.

9. The method of claim 6, wherein the detected condition comprises at least one of: a presence of the presentation device, a location of the presentation device, a movement of the presentation device, a received consumer preference, an environmental attribute, a geographical attribute, or a human interaction.

10. The method of claim 6, wherein the presentation device is one of: a television, radio, mobile telephone, portable media player, gaming device, personal computer, or home entertainment system.

11. The method of claim 6, wherein the synchronization signal further comprises at least one element associated with the storyboard, and a device identifier.

12. The method of claim 6, further comprising receiving, by the detecting electronic device from the presentation device, a consumer information, wherein the consumer information comprises a unique identifier associated with the consumer.

13. The method of claim 12, wherein the consumer information further comprises at least one of: a consumer preference, a religion, an environmental concern, a social concern, a business dependency, or a business policy.

14. A method providing a presentation by electronic devices integrated in packaging of products, the method comprising:
- storing, by a non-transitory computer-readable medium in each of a plurality of electronic devices integrated in packaging of a respective plurality of products, a plurality of elements associated with a storyboard that defines actions to provide a presentation of a message across the plurality of electronic devices, each element defining a portion of message content of the storyboard and an activity, the activity including:
  - at least one device identifier identifying electronic devices of the plurality of electronic devices, and
  - an action defining how the portion of message content is presented by the identified electronic device;
- receiving, by an electronic device of the plurality of electronic devices integrated in packaging, a synchronization signal received from another of the electronic devices of the plurality of electronic devices, wherein the synchronization signal comprises a detected condition used to select an activity from the plurality of activities, a detecting device identifier identifying the device from which the synchronization signal was received, and a receiving device identifier identifying at least one electronic device intended to respond to the synchronization signal;
- determining that the device identifier corresponds to the receiving electronic device;
- selecting an activity, based in part on the detected condition; and
- performing the action of the selected activity by the at least one electronic device intended to respond to the synchronization signal.

15. The method of claim 14, wherein the synchronization signal further comprises timing information.

16. The method of claim 14, wherein the wherein the synchronization signal further comprises an additional element not present in the stored plurality of elements.

17. The method of claim 14, wherein the synchronization signal further comprises an indication of the relative location of a portion of the plurality of electronic devices.

18. The method of claim 14 wherein the synchronization signal further comprises an alteration to at least one activity of the storyboard.

19. The method of claim 14, further comprising receiving, from a presentation device, a second synchronization signal.

20. The method of claim 19, wherein the presentation device is one of: a television, radio, mobile telephone, portable media player, gaming device, personal computer, or home entertainment system.

* * * * *